United States Patent [19]

Duran

[11] Patent Number: 5,140,896
[45] Date of Patent: Aug. 25, 1992

[54] ROTISSERIE GRILL

[76] Inventor: Vincent Duran, 94-414 Hoaeae St., Waipahu, Hi. 96797

[21] Appl. No.: 853,574

[22] Filed: Mar. 18, 1992

[51] Int. Cl.⁵ .................... A47J 37/00; A47J 37/04
[52] U.S. Cl. .................... 99/421 HV; 99/419; 99/421 H; 99/447; 99/450; 126/25 R
[58] Field of Search .................... 99/419, 420, 421 R, 99/421 A, 421 H, 421 HH, 421 HV, 421 M, 421 P, 421 TP, 421 V, 339, 340, 450, 482, 447, 401; 126/25 R, 9 R, 30; 248/129

[56] References Cited

U.S. PATENT DOCUMENTS

| | | | |
|---|---|---|---|
| 2,902,026 | 9/1959 | Hathorn, Jr. | 126/25 R |
| 3,329,082 | 7/1967 | Satkunas | 99/421 HV |
| 3,363,543 | 1/1988 | Roberts et al. | 99/421 HV |
| 3,459,171 | 8/1969 | Swanson | 126/25 R |
| 3,491,679 | 1/1970 | Kelly | 99/447 |
| 3,683,791 | 8/1972 | Rast, Jr. | 99/447 |
| 4,090,490 | 5/1978 | Riley et al. | 126/25 R |
| 4,108,055 | 8/1978 | Simmons | 99/339 |
| 4,592,335 | 6/1986 | Beller | 126/9 R |
| 4,665,891 | 5/1987 | Nemec et al. | 99/447 |
| 4,788,906 | 12/1988 | Starks | 99/450 |

Primary Examiner—Timothy F. Simone
Attorney, Agent, or Firm—Michael I. Kroll

[57] ABSTRACT

An improved rotisserie grill is provided and consists of an elongated rectangular framework having four vertical legs, one in each corner and two side cross members, each extending horizontally between two legs. A rotatable spit is supported longitudinally above the framework. An electric motor is supported on the framework to rotate the spit. A semi-cylindrical fire bowl having a curved inner surface is affixed to the framework with the side cross members supporting the bottom ends of the fire bowl. A grate is carried in the fire bowl to hold fuel thereon so that when the fuel is burned the curved inner surface of the fire bowl will reflect heat towards the rotating spit.

6 Claims, 2 Drawing Sheets

U.S. Patent        Aug. 25, 1992        Sheet 1 of 2        5,140,896
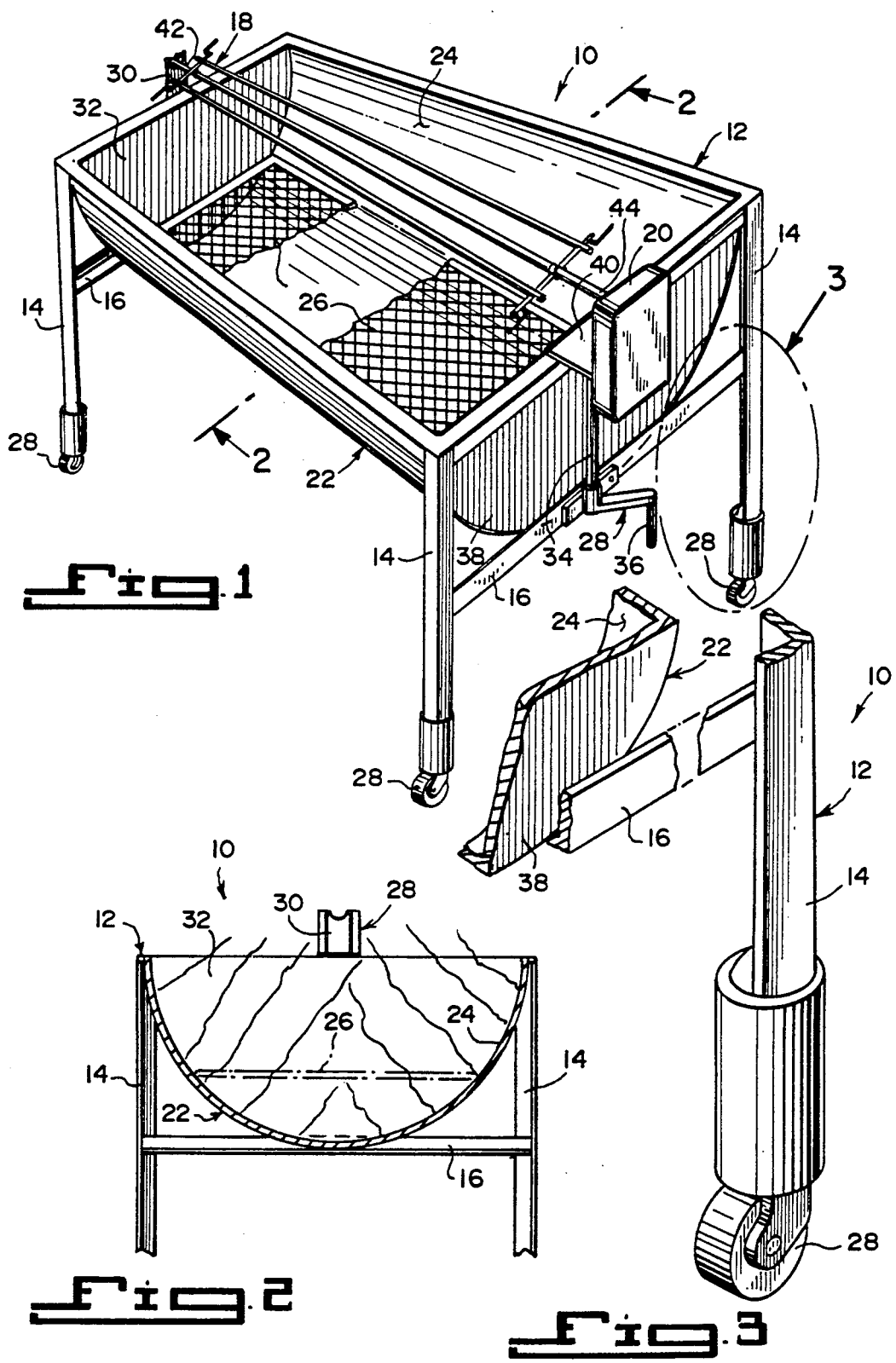

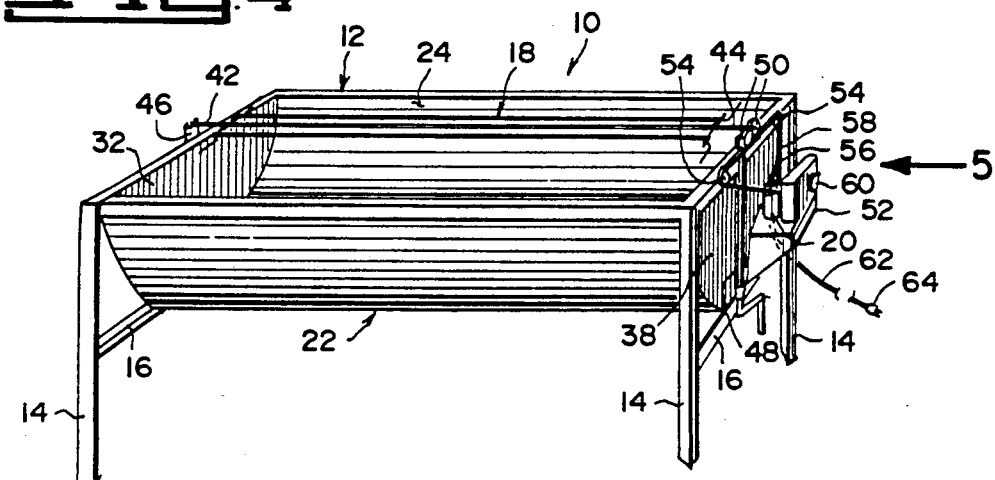
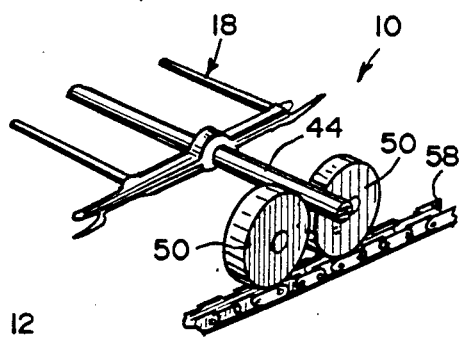
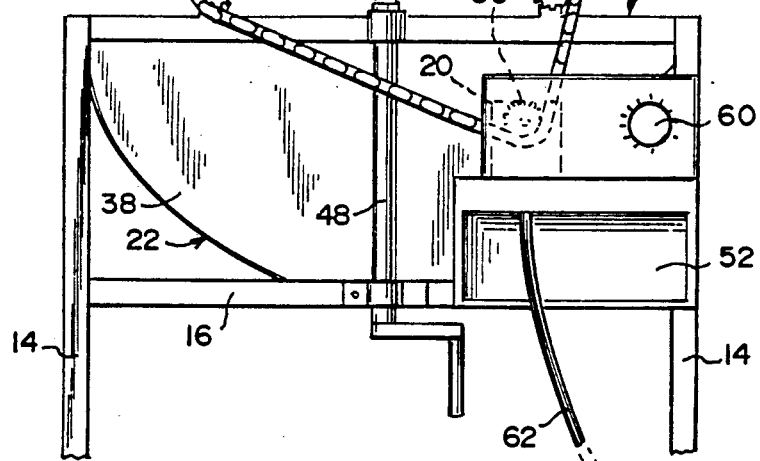

ROTISSERIE GRILL

BACKGROUND OF THE INVENTION

1. Field of the Invention

The instant invention relates generally to cooking equipment and more specifically it relates to an improved rotisserie grill.

2. Description of the Prior Art

Numerous cooking equipment have been provided in prior art that are adapted to prepare food for eating by applying heat to the food. While these units may be suitable for the particular purpose to which they address, they would not be as suitable for the purposes of the present invention as heretofore described.

SUMMARY OF THE INVENTION

A primary object of the present invention is to provide an improved rotisserie grill that will overcome the shortcomings of the prior art devices.

Another object is to provide an improved rotisserie grill that is a cooking device equipped with a motor driven rotating spit on which meat or other food is broiled.

An additional object is to provide an improved rotisserie grill that includes a semi-cylindrical fire bowl which will reflect heat towards the rotating spit, from fuel burned within the fire bowl.

A further object is to provide an improved rotisserie grill that is simple and easy to use.

A still further object is to provide an improved rotisserie grill that is economical in cost to manufacture.

Further objects of the invention will appear as the description proceeds.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWING FIGURES

FIG. 1 is a perspective view of a first embodiment of the instant invention.

FIG. 2 is a cross sectional view taken along line 2—2 in FIG. 1.

FIG. 3 is an enlarged detailed perspective view as indicated by arrow 3 in FIG. 1.

FIG. 4 is a perspective view of a second embodiment of the instant invention with parts broken away.

FIG. 5 is an end view thereof taken in direction of arrow 5 in FIG. 4.

FIG. 6 is an enlarged detailed perspective view as indicated by arrow 6 in FIG. 5.

DETAILED DESCRIPTION OF THE PREFERRED EMBODIMENTS

Turning now descriptively to the drawings, in which similar reference characters denote similar elements throughout the several views, the Figures illustrate an improved rotisserie grill 10 consisting of an elongated rectangular framework 12 having four vertical legs 14, one in each corner and two side cross members 16, each extending horizontally between two legs 14. A rotatable spit 18 is supported longitudinally above the framework 12.

An electric motor 20 is supported on the framework 12 to rotate the spit 18. A semi-cylindrical fire bowl 22 having a curved inner surface 24 is affixed to the framework 12 with the side cross members 16 supporting the bottom end of the fire bowl 22. A grate 26 is carried in the fire bowl 22 to hold fuel, such as charcoal briquettes or the like, thereon so that when the fuel is burned the curved inner surface 24 of the fire bowl 22 will reflect heat towards the rotating spit 18.

The improved rotisserie grill 10 further includes four casters 28 each mounted to the lower end of each leg 14 of the framework 12 making the improved rotisserie grill 10 portable so it can be moved from place to place.

The improved rotisserie grill 10, as shown in FIGS. 1 and 2 further includes a mechanism 28 for adjusting the height of the rotatable spit 18 and the electric motor 20 with respect to the fire bowl 22. The height adjusting mechanism 28 includes a height adjustable bearing member 30 connected to the framework 12 at one side 32 of the fire bowl 22. A height adjustable stanchion 34 has a crank handle 36 to raise and lower the stanchion 34 and is connected to the framework 12 at the other side 38 of the fire bowl 22. A mounting bracket 40 for electric motor 20 is affixed to the top end of the stanchion 34 whereby one end 42 of the rotatable spit 18 is carried on the bearing member 30 while other end 44 of the rotatable spit 18 engages directly with the electric motor 20.

The improved rotisserie grill 10 as shown in FIGS. 4 and 6, further includes a bearing member 46 connected to the framework 12 at one side 32 of the fire bowl 22. A stanchion 48 is connected to the framework 12 at other side 38 of the fire bowl 22. The stanchion 48 has a pair of rollers 50 carried on the top end thereof. A mounting bracket 52 for the electric motor 20 is affixed to the framework 12 at the side 38 of the fire bowl 22 proximate the stanchion 48. A pair of driven sprockets 54 are carried on the framework 12 on opposite sides of the stanchion 38, while a drive sprocket 56 is operable by the electric motor 20. A continuous chain 58 which extends about the driven sprockets 54 and the drive sprocket 56 engages with the rollers 50 from underneath, whereby one end 42 of the rotatable spit 18 is carried on the bearing member 46 while the other end 44 of the rotatable spit 18 engages directly onto the rollers 50.

The electric motor 20 further includes a dial 60 for controlling the speed of the electric motor. An elongated electric cord 62 extending therefrom and a male plug 64 on the distal end of the electric cord 62 engages with a female socket (not shown) to receive electric current.

LIST OF REFERENCE NUMBERS 10 improved rotisserie grill
12 elongated rectangular framework
14 leg on 12
16 side cross member on 12
18 rotatable spit
20 electric motor
22 semi-cylindrical fire bowl
24 curved inner surface in 22
26 grate
28 height adjusting mechanism
30 height adjustable bearing member
32 one side of 22

34 height adjustable stanchion
36 crank handle on 34
38 other side of 22
40 mounting bracket for 20
42 one end of 18
44 other end of 18
46 bearing member
48 stanchion
50 roller
52 mounting bracket
54 driven sprocket
56 drive sprocket
58 continuous chain
60 dial on 20
62 elongated electric cord from 20
64 male plug on 62

It will be understood that each of the elements described above, or two or more together may also find a useful application in other types of methods differing from the type described above.

While certain novel features of this invention have been shown and described and are pointed out in the annexed claims, it is not intended to be limited to the details above, since it will be understood that various omissions, modifications, substitutions and changes in the forms and details of the device illustrated and in its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and desired to be protected by Letters Patent is set forth in the appended claims:

1. An improved rotisserie grill comprising:
   (a) an elongated rectangular framework having four vertical legs, one in each corner and two side cross members, each extending horizontally between two legs;
   (b) a rotatable spit, supported longitudinally about said framework;
   (c) an electric motor supported on said framework to rotate said spit;
   (d) a semi-cylindrical fire bowl having a curved inner surface affixed to said framework with the side cross members supporting the bottom ends of said fire bowl; and
   (e) a grate carried in said fire bowl to hold fuel thereon so that when the fuel is burned the curved inner surface of said fire bowl will reflect heat towards said rotating spit.

2. An improved rotisserie grill as recited in claim 1, further including four casters, each mounted to the lower end of each leg of said framework making said improved rotisserie grill portable so it can be moved from place to place.

3. An improved rotisserie grill as recited in claim 2, further including means for adjusting the height of said rotatable spit and said electric motor with respect to said fire bowl.

4. An improved rotisserie grill as recited in claim 3, wherein said height adjusting means includes:
   (a) a height adjustable bearing member connected to said framework at one side of said fire bowl;
   (b) a height adjustable stanchion having a crank handle to raise and lower said stanchion connected to said framework at other side of said fire bowl; and
   (c) a mounting bracket for said electric motor affixed to the top end of said stanchion whereby one end of said rotatable spit is carried on said bearing member while other end of said rotatable spit engages directly with said electric motor.

5. An improved rotisserie grill as recited in claim 2, further including:
   (a) a bearing member connected to said framework at one side of said fire bowl;
   (b) a stanchion connected to said framework at other side of said fire bowl, said stanchion having a pair of rollers carried on the top end thereof;
   (c) a mounting bracket for said electric motor affixed to said framework at the side of said fire bowl proximate said stanchion;
   (d) a pair of driven sprockets carried on said framework on opposite sides of said stanchion;
   (e) a drive sprocket operable by said electric motor; and
   (f) a continuous chain which extends about said driven sprockets and said drive sprocket and engages the rollers from underneath, whereby one end of said rotatable spit is carried on said bearing member while other end of said rotatable spit engages directly onto the rollers.

6. An improved rotisserie grill as recited in claim 5, wherein said electric motor further includes:
   (a) a dial for controlling the speed of said electric motor;
   (b) an elongated electric cord extending therefrom; and
   (c) a male plug on the distal end of said electric cord to engage with a female socket to receive electric current.

* * * * *